E. R. NEBELING.
SAFETY PIN.
APPLICATION FILED APR. 11, 1917.

1,252,930.

Patented Jan. 8, 1918.

WITNESSES

INVENTOR
E. R. Nebeling
BY
ATTORNEYS

UNITED STATES PATENT OFFICE.

EDMUND R. NEBELING, OF NEW YORK, N. Y.

SAFETY-PIN.

1,252,930.  Specification of Letters Patent.  Patented Jan. 8, 1918.

Application filed April 11, 1917. Serial No. 161,190.

*To all whom it may concern:*

Be it known that I, EDMUND R. NEBELING, a citizen of the United States, and a resident of the city of New York, Woodhaven, borough of Queens, in the county of Queens and State of New York, have invented a new and Improved Safety-Pin, of which the following is a full, clear, and exact description.

My invention relates to safety pins. An object thereof is to provide a safety pin which will not unlock accidentally.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
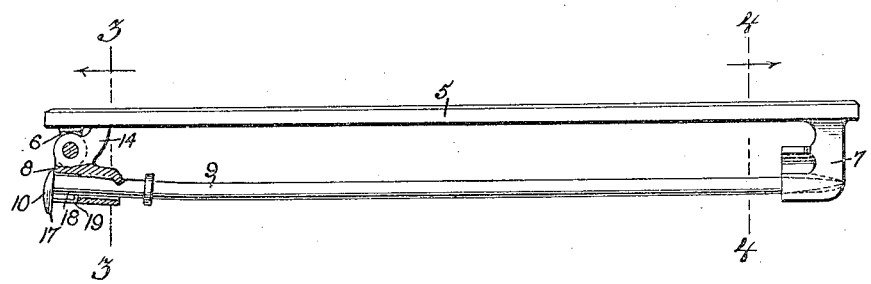
Figure 1 is a side elevation of a pin embodying my invention, a portion of the same being broken out to show the details of construction.

Referring to the drawings, 5 is the body of the pin, the rear face of which is provided with lugs 6 in one end and a socket 7 near the other end. A pin carrier 8 is pivotally connected to the lug 6. A pin 9 is slidably mounted in the carrier, the movement of the pin being limited by the head 10 of the pin and a collar 11 formed thereon. The socket 7 has an opening 12 in the top thereof which leads to the side, through which the end of the pin can be entered into the socket when the collar 11 of the pin 9 bears against the adjacent end of the carrier. By bringing the head 10 of the pin against the adjacent end of the carrier the pointed end of the pin is forced into the socket. See Fig. 1. To facilitate the engagement of the pin with the socket a lip 13 is formed at the top of the opening which leads to the socket.

To increase the frictional resistance of the pin in the carrier a heel 14 is provided on the carrier which engages the rear face of the body 5 when the pin 9 is forced to engage the socket. See the position shown in dotted line in Fig. 2 and that shown in full line in the same figure. In consequence the pin 9 is under a strain when engaging the socket, thus reducing the chances of the disengagement of the pin from the socket.

To further insure against inadvertent displacement of the pin 9 when in the position shown in Fig. 1, a recess 15 is formed in the pin into which a projection 16 provided in the carrier is adapted to snap when the head of the pin 10 is brought against the carrier, or, in other words, when the end of the pin is fully engaged in the socket 7. The engagement of the projection with the recess is insured by the reaction produced between the stressed pin 9 under the action of the heel 14 of the carrier.

Figure 2:
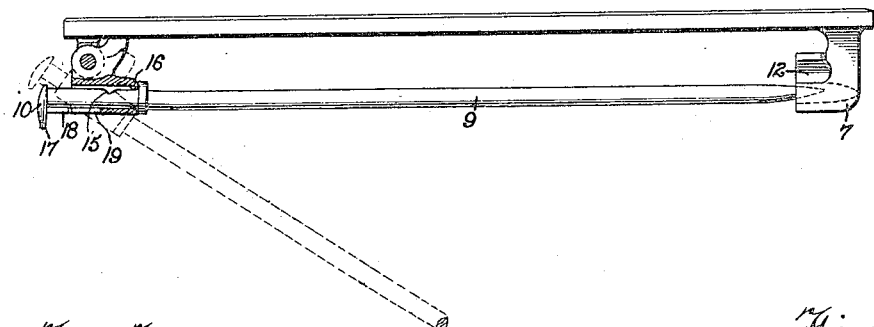
Fig. 2 is a similar view showing the pin proper in a displaced position.
Figure 3:
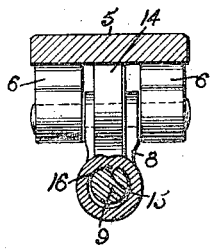
Fig. 3 is a section on line 3—3, Fig. 1.
Figure 4:
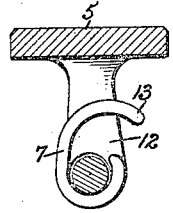
Fig. 4 is a section on line 4—4, Fig. 1.

To facilitate the operation of the pin the head 10 is eccentric relative to the pin to present a lip 17, and to insure the engagement of the projection 16 with the recess 15 a key 18 is provided on the pin, for which a notch 19 is formed in the carrier. The key is out of engagement with the notch 19 when the pin is in position as shown in Fig. 2. By turning the pin it is prevented from sliding in the carrier and, therefore, the engagement of the pin with the socket 7 is facilitated. When the pin is engaged with the socket (see Fig. 2) it is turned to bring the key into register with the notch and can then be pushed home (see Fig. 1).

I claim:

1. A safety pin comprising a body portion, a pin carrier mounted to swing to and from the body portion, a pin having one end thereof reciprocally mounted in the carrier, a socket from the body for engaging the other end of the pin, said carrier having means for engaging the body when said pin engages the socket so as to maintain said pin in a stressed condition, and means influenced by the stressed condition of the pin for locking the pin to the carrier when said pin is fully engaged with the socket.

2. A safety pin comprising a body portion, a pin carrier mounted to swing to and from the body portion, a pin having a limited sliding movement in said carrier, a socket on the body for receiving the pin, a heel associated with the carrier and adapted to engage the body before the pin alines with the socket whereby said pin is stressed when in engagement with the socket, means influenced by the stressed condition of the pin for locking the pin to the carrier when said pin is fully engaged with the socket, and means for preventing the rotation of said pin in the carrier to maintain said locking means in register.

EDMUND R. NEBELING.

Copies of this patent may be obtained for five cents each, by addressing the "Commissioner of Patents, Washington, D. C."